United States Patent
Liu

(10) Patent No.: US 11,510,164 B2
(45) Date of Patent: Nov. 22, 2022

(54) METHOD AND DEVICE FOR SYNCHRONOUS BROADCASTING TRANSMISSION SIGNAL BLOCK

(71) Applicant: BEIJING XIAOMI MOBILE SOFTWARE CO., LTD., Beijing (CN)

(72) Inventor: Yang Liu, Beijing (CN)

(73) Assignee: BEIJING XIAOMI MOBILE SOFTWARE CO., LTD., Beijing (CN)

(*) Notice: Subject to any disclaimer, the term of this patent is extended or adjusted under 35 U.S.C. 154(b) by 27 days.

(21) Appl. No.: 17/042,174

(22) PCT Filed: Apr. 2, 2018

(86) PCT No.: PCT/CN2018/081526
§ 371 (c)(1),
(2) Date: Sep. 27, 2020

(87) PCT Pub. No.: WO2019/191858
PCT Pub. Date: Oct. 10, 2019

(65) Prior Publication Data
US 2021/0029657 A1   Jan. 28, 2021

(51) Int. Cl.
*H04L 5/00* (2006.01)
*H04W 56/00* (2009.01)
*H04W 24/08* (2009.01)
*H04W 68/00* (2009.01)
*H04W 72/00* (2009.01)

(52) U.S. Cl.
CPC ....... *H04W 56/0015* (2013.01); *H04W 24/08* (2013.01); *H04W 68/005* (2013.01); *H04W 72/005* (2013.01)

(58) Field of Classification Search
CPC ............ H04W 56/0015; H04W 24/08; H04W 68/005; H04W 72/005; H04W 76/45;
(Continued)

(56) References Cited

U.S. PATENT DOCUMENTS

| 2014/0198772 A1 | 7/2014 | Baldemair et al. |
| 2015/0043523 A1 | 2/2015 | Luo et al. |

(Continued)

FOREIGN PATENT DOCUMENTS

| CN | 101299822 A | 11/2008 |
| CN | 104301273 A | 1/2015 |

(Continued)

OTHER PUBLICATIONS

International Search Report in the international application No. PCT/CN2018/081526, dated Dec. 28, 2018.

(Continued)

*Primary Examiner* — Said M Elnoubi
(74) *Attorney, Agent, or Firm* — Syncoda LLC; Feng Ma

(57) ABSTRACT

A method for synchronous broadcasting transmission of a signal block includes: determining information to be transmitted, wherein the information to be transmitted at least comprises synchronous information; according to the determined information to be transmitted, generating a signal block that contains an SS/PBCH Block (SSB), wherein the proportion of a bandwidth occupied by the signal block is not less than the proportion of a preset basic bandwidth; and transmitting the signal block to a user equipment.

16 Claims, 15 Drawing Sheets

(58) Field of Classification Search
CPC .... H04W 48/12; H04W 48/16; H04L 5/0048; H04L 5/1469; H04L 5/0053
See application file for complete search history.

(56) References Cited

U.S. PATENT DOCUMENTS

| | | | | |
|---|---|---|---|---|
| 2018/0084593 | A1* | 3/2018 | Chen | H04L 5/0048 |
| 2020/0084737 | A1* | 3/2020 | Lee | H04L 27/2613 |
| 2020/0314776 | A1* | 10/2020 | Harada | H04W 24/08 |
| 2021/0058949 | A1* | 2/2021 | Kim | H04W 72/1268 |
| 2021/0153107 | A1* | 5/2021 | Xu | H04W 56/00 |

FOREIGN PATENT DOCUMENTS

| | | | |
|---|---|---|---|
| CN | 106161317 A | 11/2016 | |
| CN | 106453182 A | 2/2017 | |
| CN | 106664280 A | 5/2017 | |
| CN | 107528682 A * | 12/2017 | H04L 5/0048 |

OTHER PUBLICATIONS

English translation of the Written Opinion of the International Search Authority in the international application No. PCT/CN2018/081526, dated Dec. 28, 2018.
First Office Action of the Chinese application No. 201880000489.9, dated Apr. 24, 2020.
3GPP TSG RAN WG1 Meeting #92, R1-1801839, Spreadtrum Communications, "Discussion on SS/PBCH block in NR unlicensed", dated Mar. 2, 2018.
3GPP TSG RAN WG1 Meeting #92, R1-1802381, Intel Corporation, "Remaining Details of SS/PBCH Block", mailed on Mar. 2, 2018.

* cited by examiner

METHOD AND DEVICE FOR SYNCHRONOUS BROADCASTING TRANSMISSION SIGNAL BLOCK

CROSS-REFERENCE TO RELATED APPLICATIONS

The present application is a national stage of International Application No. PCT/CN2018/081526 filed on Apr. 2, 2018, the disclosure of which is hereby incorporated by reference in its entirety.

TECHNICAL FIELD

The present disclosure relates to the field of communication technologies, and more particularly, to a method and device for synchronous broadcasting transmission of a signal block.

BACKGROUND

In related technologies, the industry has recently conducted a project research on $5^{th}$ Generation (5G) unlicensed spectrum and proposes a project to support individual networking of unlicensed cells. In the design of unlicensed spectrum, the transmission of signal blocks needs to be considered, and there is no effective solution in the industry yet.

SUMMARY

Embodiments of the present disclosure provide a method and device for synchronous broadcasting transmission of a signal block. The technology method is as follows.

In accordance with a first aspect of the embodiment of the present disclosure, a method for synchronous broadcasting transmission of a signal block is provided. The method includes:

determining information to be transmitted, the information to be transmitted including at least synchronous information;

generating, according to the determined information to be transmitted, a signal block that contains an SS/PBCH Block (SSB), the signal block occupying a bandwidth proportion which is not less than a preset basic bandwidth proportion;

transmitting the signal block to a user equipment.

The embodiment of present disclosure provides a technical solution that may include the following beneficial effects: in the present embodiment, the bandwidth occupied by the signal block is adjusted so that the proportion of bandwidth occupied by the signal block is not less than the proportion of preset basic bandwidth to meet the requirements of communication protocol, to implement the transmission of the signal block, and to reduce the waste of resources.

In an embodiment, the SSB occupies 2 symbols in time domain, or 4 symbols in time domain.

The embodiment of present disclosure provides a technical solution that may include the following beneficial effects: in the present embodiment, multiple solutions are provided, the SSB may occupy 2 symbols in time domain, or 4 symbols in time domain. No matter how many symbols are occupied in time domain, the number of symbols occupied by the SSB is increased in frequency domain, that is, the occupied bandwidth is increased.

In an embodiment, a primary synchronous signal and a secondary synchronous signal in the SSB occupy a total of 2 symbols in time domain, or a total of 1 symbol in time domain.

The embodiment of present disclosure provides a technical solution that may include the following beneficial effects: in the present embodiment, multiple implementations of possible resource locations occupied by the primary synchronous signal and the secondary synchronous signal are provided in order to implement and increase the bandwidth occupied by the signal block.

In an embodiment, the synchronous information in the SSB is time-division multiplexed or frequency-division multiplexed with information of physical broadcast channel (PBCH).

The embodiment of present disclosure provides a technical solution that may include the following beneficial effects: in the present embodiment, multiple position relation of the synchronous information and the information of PBCH on time-frequency resources is provided to facilitate flexible adoption.

In an embodiment, the information to be transmitted further includes information of physical downlink common channel.

The information of physical downlink public channel is frequency-division multiplexed with the SSB.

The embodiment of present disclosure provides a technical solution that may include the following beneficial effects: in the present embodiment, the information of physical downlink common channel is added, that is, the information of physical downlink public channel is frequency-division multiplexed with the SSB, further increases the bandwidth occupied by the signal block to meet the requirements of communication protocol.

In an embodiment, the information of physical downlink common channel includes at least one of: data information, a control resource set and a reference signal.

The data information includes at least one of: data information of remaining minimum system information (RMSI), paging information and other information about broadcast channels;

The control resource set includes control information for scheduling RMSI.

The embodiment of present disclosure provides a technical solution that may include the following beneficial effects: the present embodiment provides multiple information that can be multiplexed by the frequency division to ensure, as much as possible, that the proportion occupied by the signal block is not less than the proportion of the preset basic bandwidth.

In an embodiment, the information of physical downlink common channel occupies signal resources on one or both sides of the SSB in frequency domain.

The embodiment of present disclosure provides a technical solution that may include the following beneficial effects: in the present embodiment, the information of physical downlink common channel and SSB can just be frequency-division multiplexed, and the position relation between the information of physical downlink common channel and SSB in frequency domain can be flexibly configured.

In an embodiment, before transmitting the signal block to the user equipment, the method further includes:

performing short monitoring for a channel corresponding to the signal block at current moment to detect whether the channel is idle;

transmitting the signal block to the user equipment includes:

transmitting the signal block to the user equipment if the channel is idle.

The embodiment of present disclosure provides a technical solution that may include the following beneficial effects: the present embodiment increases the bandwidth occupied by the signal block, and is more suitable for using the method of short monitoring to detect whether the channel is idle, thus improving the detection efficiency and accuracy.

In accordance with a second aspect of the embodiment of the present disclosure, a device for synchronous broadcasting transmission of signal blocks is provided, the device includes:

a determination module, configured to determine information to be transmitted, the information to be transmitted including at least synchronous information;

a generation module, configured to generate, according to the determined information to be transmitted, a signal block that contains an SSB, the signal block occupying a bandwidth proportion which is not less than a preset basic bandwidth proportion;

a transmission module, configured to transmit the signal block to a user equipment.

In an embodiment, the SSB occupies 2 symbols in time domain, or 4 symbols in time domain.

In an embodiment, a primary synchronous signal and a secondary synchronous signal in the SSB occupy a total of 2 symbols in time domain, or a total of 1 symbol in time domain.

In an embodiment, the synchronous information in the SSB is time-division multiplexed or frequency-division multiplexed with information of physical broadcast channel (PBCH).

In an embodiment, the information to be transmitted further includes information of physical downlink common channel;

The information of physical downlink public channel is frequency-division multiplexed with the SSB.

In an embodiment, the information of physical downlink common channel includes at least one of: data information, a control resource set and a reference signal;

wherein the data information includes at least one of: data information of remaining minimum system information (RMSI), paging information and other information about broadcast channels;

the control resource set includes control information for scheduling RMSI.

In an embodiment, the information of physical downlink common channel occupies signal resources on one or both sides of the SSB in frequency domain.

In an embodiment, the device further includes:

a detection module, configured to perform short monitoring for a channel corresponding to the signal block at current moment to detect whether the channel is idle.

The transmission module includes:

a transmission sub-module, configured to transmit the signal block to the user equipment if the channel is idle.

In accordance with a third aspect of the embodiment of the present disclosure, a device for synchronous broadcasting transmission of a signal block is provided, the device includes:

a processor;

a memory for storing instructions executable by the processor;

wherein the processor is configured to:

determine information to be transmitted, the information to be transmitted including at least synchronous information;

generate, according to the determined information to be transmitted, a signal block that contains an SSB, the signal block occupying a bandwidth proportion which is not less than a preset basic bandwidth proportion;

transmit the signal block to a user equipment.

In accordance with a fourth aspect of the embodiment of the present disclosure, a computer-readable storage medium is provided, the computer-readable storage medium has stored therein computer instructions that when executed by a processor, implement the method for synchronous broadcasting transmission of a signal block as described above.

It is to be understood that the above general description and the details described later are merely exemplary and explanatory, and do not limit the present disclosure.

BRIEF DESCRIPTION OF THE DRAWINGS

The accompanying drawings, which are incorporated in and constitute a part of this specification, illustrate embodiments consistent with the disclosure and, and together with the description, serve to explain the principles of the disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise indicated. The implementations set forth in the following description of exemplary embodiments do not represent all implementations consistent with the disclosure. Instead, they are merely examples of devices and methods consistent with aspects related to the disclosure as recited in the appended claims.

In related technologies, the industry has proposed that the implementation independent networking of unlicensed spectrum is desirable, that is, independent of the new radio (NR) cell, and with the cells in the unlicensed frequency band performing all functions such as initial access. Firstly, the transmission of a signal block in unlicensed spectrum cells needs to be implemented. There is no effective solution for this yet. One possible solution is to follow the design of the transmission of the SSB (SS/PBCH BLOCK, hereafter abbreviated as SSB) in the NR cell. However, the use of unlicensed spectrum is subject to the principle of occupied channel bandwidth (OCB), which means that transmitting signal needs to occupy a preset proportion of the transmitting bandwidth, and the preset proportion is 80% to 100%. But the SSB of NR cell can hardly occupy the preset proportion of the transmitting bandwidth.

To solve the problem described above, in the present embodiment, the bandwidth occupied by the signal block is increased to meet the requirements of the communication protocol as much as possible.

Figure 1:
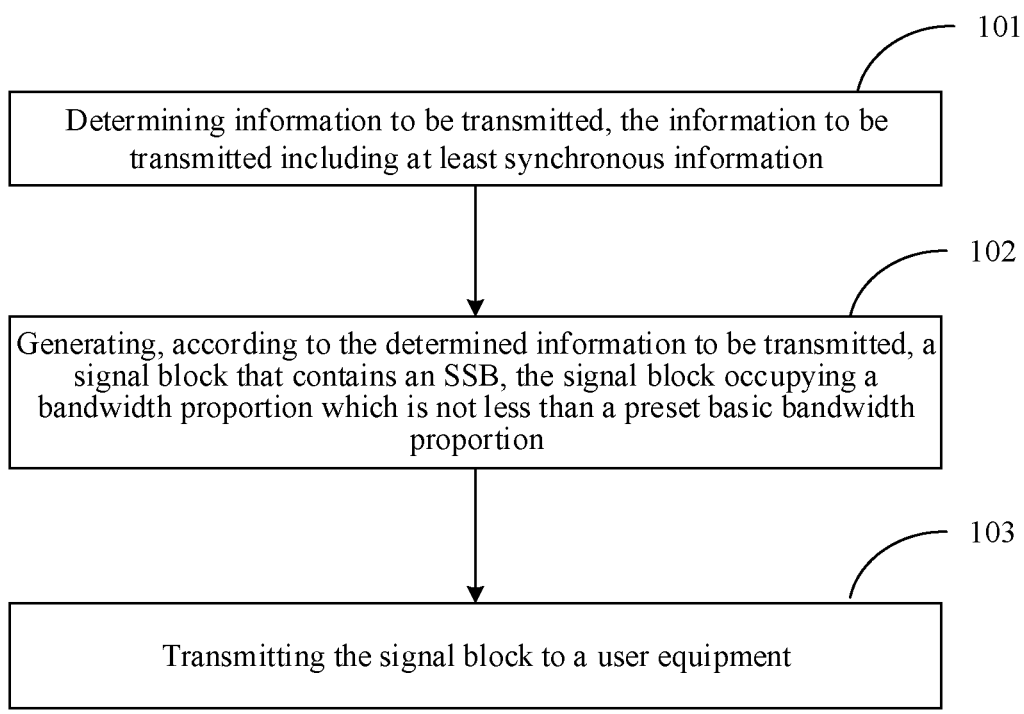
FIG. 1 is a flow chart illustrating a method for synchronous broadcasting transmission of a signal block according to an exemplary embodiment.

FIG. 1 is a flow chart illustrating a method for synchronous broadcasting transmission of a signal block according to an exemplary embodiment. The method for synchronous broadcasting transmission of a signal block is used for the network access device such as base station. As shown in FIG. 1, the method includes the following steps 101 to 103.

In step 101, information to be transmitted is determined. The information to be transmitted includes at least synchronous information.

In step 102, a signal block that contains an SSB is generated according to the determined information to be transmitted. The signal block occupies a bandwidth proportion which is not less than a preset basic bandwidth proportion.

In step 103, the signal block is transmitted to a user equipment.

The bandwidth occupied by the signal block is increased in the present embodiment to meet the requirements of communication protocol as much as possible.

In an embodiment, the SSB occupies 2 symbols in time domain, or 4 symbols in time domain.

In the present embodiment, the symbols in time domain occupied by the SSB are decreased to increase the symbols in frequency domain occupied by the SSB, that is, the bandwidth occupied by the signal block is increased.

Figure 2:
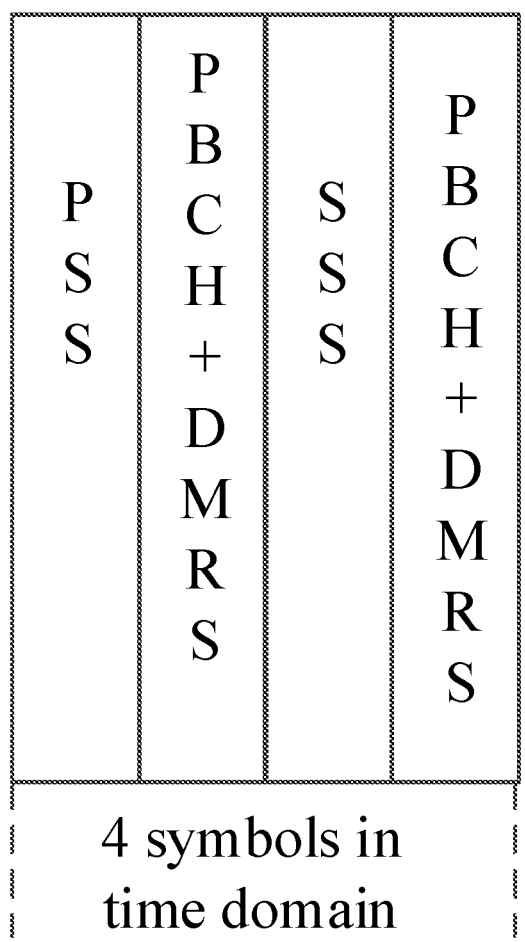
FIG. 2 is a schematic diagram illustrating a signal block according to an exemplary embodiment.

As shown in FIG. 2, the synchronous information includes a primary synchronous signal (PSS) and a secondary synchronous signal (SSS). The SSB further includes broadcast information and DMRS (Demodulation Reference Signal). The broadcast information is carried on the Physical Broadcast Channel (PBCH). PSS occupies one symbol in time domain, SSS occupies one symbol in time domain, and PBCH and DMRS occupy two symbols in time domain. That is, the SSB occupies four symbols in time domain.

Figure 3:
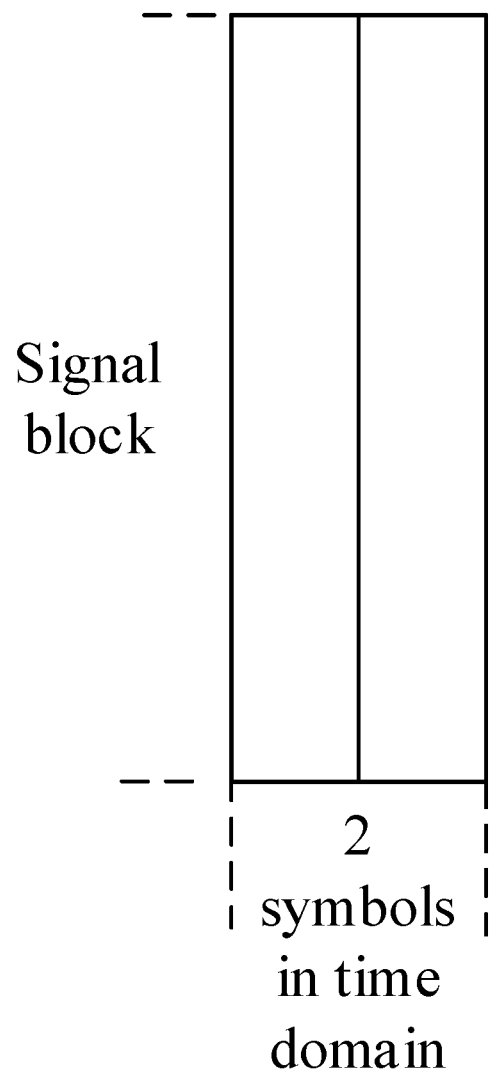
FIG. 3 is a schematic diagram illustrating a signal block according to a particular first embodiment.

As shown in FIG. 3, the SSB may occupies 2 symbols in time domain. At this point, there may be multiple implementations as can be seen the following embodiments.

In an embodiment, the primary synchronous signal and the secondary synchronous signal in the SSB occupy a total of 2 symbols in time domain, or a total of 1 symbol in time domain.

In an embodiment, the synchronous information in the SSB is time-division multiplexed or frequency-division multiplexed with information of PBCH.

Figure 4:
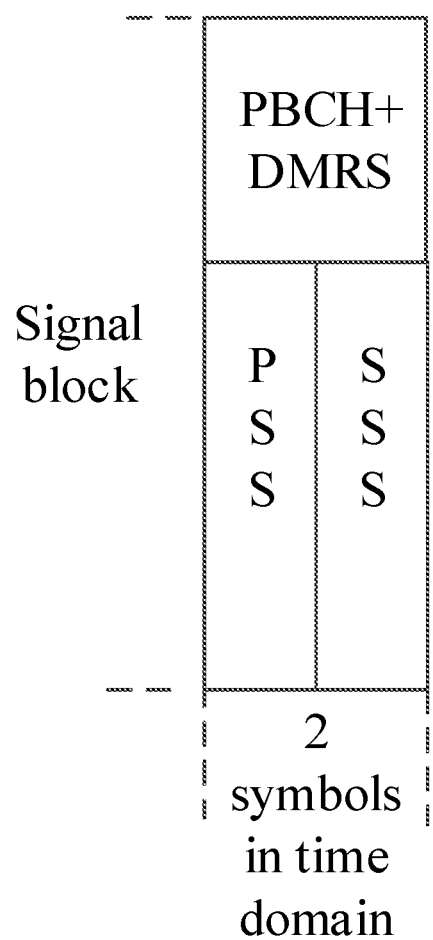
FIG. 4 is a schematic diagram illustrating a signal block according to an exemplary embodiment.

As shown in FIG. 4, the PSS and the SSS occupy a total of 2 symbols in time domain. To ensure that the SSB can occupy 2 symbols in time domain, the synchronous information is frequency-division multiplexed with the information of PBCH. In the present embodiment, the width of the signal block in time domain is reduced and the bandwidth of the signal block in frequency domain is increased by frequency-division multiplexing of the synchronous information with the information of PBCH.

Figure 5:
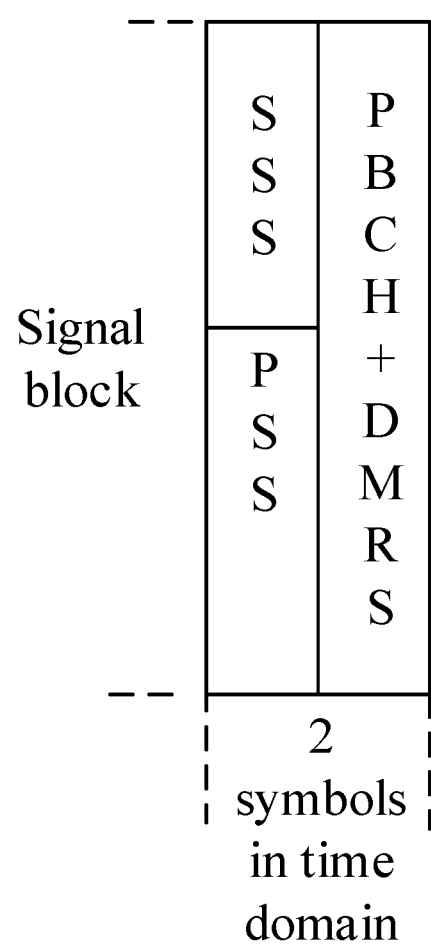
FIG. 5 is a schematic diagram illustrating a signal block according to a particular first embodiment.

As shown in FIG. 5, the PSS and the SSS occupy a total of 1 symbol in time domain. To ensure that the SSB can occupy 2 symbols in time domain, the synchronous information is time-division multiplexed with the information of PBCH. In the present embodiment, the width of the signal block in time domain is reduced and the bandwidth of the signal block in frequency domain is increased by frequency-division multiplexing of the PSS and the SSS.

If the synchronous information, the information of PBCH and DMRS jointly occupy a lower bandwidth, other information can also be frequency-division multiplexed, as can be see in the following embodiment.

In an embodiment, the information to be transmitted further includes information of physical downlink common channel.

The information of physical downlink public channel is frequency-division multiplexed with the SSB.

Figure 6:
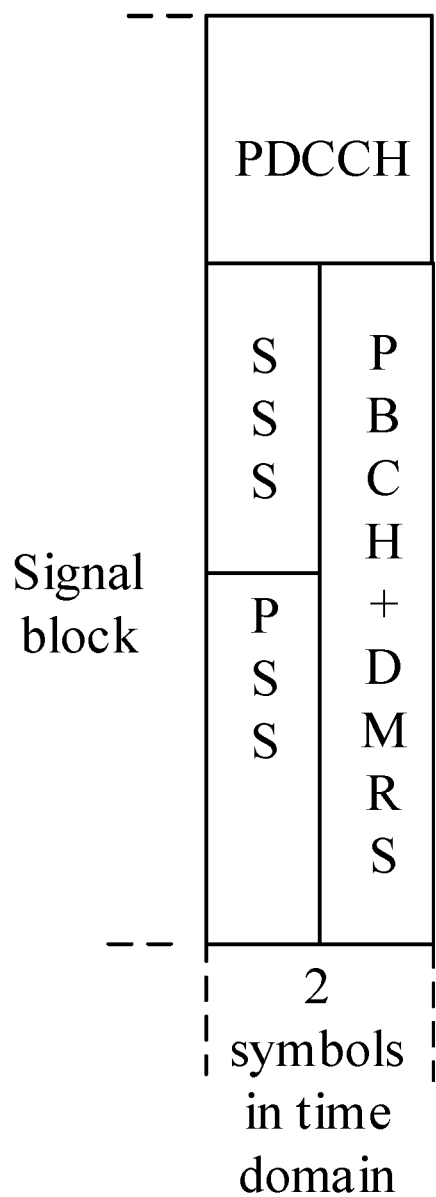
FIG. 6 is a schematic diagram illustrating a signal block according to a particular first embodiment.
Figure 7:
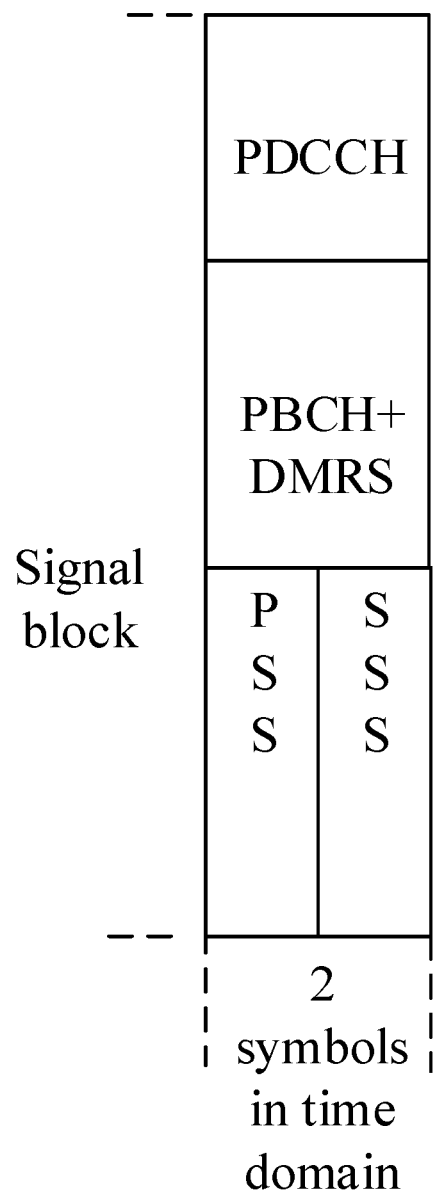
FIG. 7 is a schematic diagram illustrating a signal block according to an exemplary embodiment.
Figure 8:
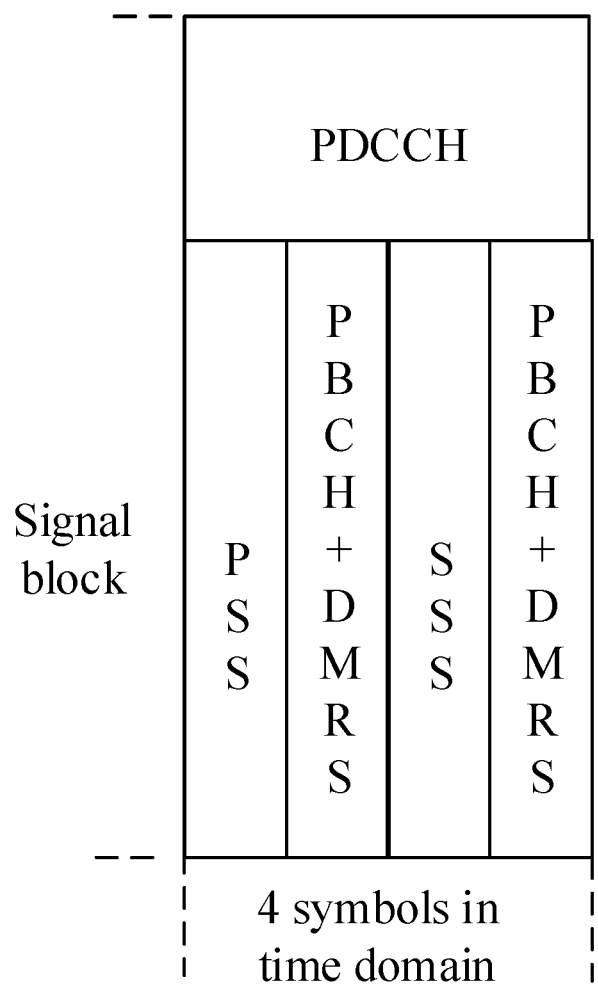
FIG. 8 is a schematic diagram illustrating a signal block according to a particular first embodiment.

As shown in FIG. 6, FIG. 7 and FIG. 8, the SSB occupies 2 symbols in time domain, or occupies 4 symbols in time domain; the PSS and the SSS occupy a total of 2 symbols in time domain, or occupy a total of 1 symbol in time domain. In the cases described above, the SSB can be frequency-division multiplexed with the information of physical downlink common channel to increase the bandwidth occupied by the signal block.

In an embodiment, the information of physical downlink common channel includes at least one of: data information, a control resource set (CORESET) and a reference signal.

Here, the data information includes at least one of: data information of remaining minimum system information (RMSI), paging information and other information about broadcast channels (OSI).

The control resource set includes control information for scheduling RMSI.

The base station detects in advance whether there is any of the above-mentioned information to be transmitted. When one or more pieces of the above-mentioned information are required to be transmitted, the above-mentioned information is transmitted by frequency-division multiplexing of the information of physical downlink common channel with the SSB. If there is no above-mentioned information to be transmitted, it may continue to transmit the SSB.

Here, the data information can be carried by the Physical Downlink Shared Channel (PDSCH). CORESET may carry Physical Downlink Control Channel (PDCCH). In the present embodiment, a US-Specific Search Space may be not contained in the PDCCH and a common Search Space may be contained in the PDCCH. That is, there is no need to perform blind detection for the UE-Specific Space in the PDCCH.

In an embodiment, the information of physical downlink common channel occupies signal resources on one or both sides of the SSB in frequency domain.

Figure 9:
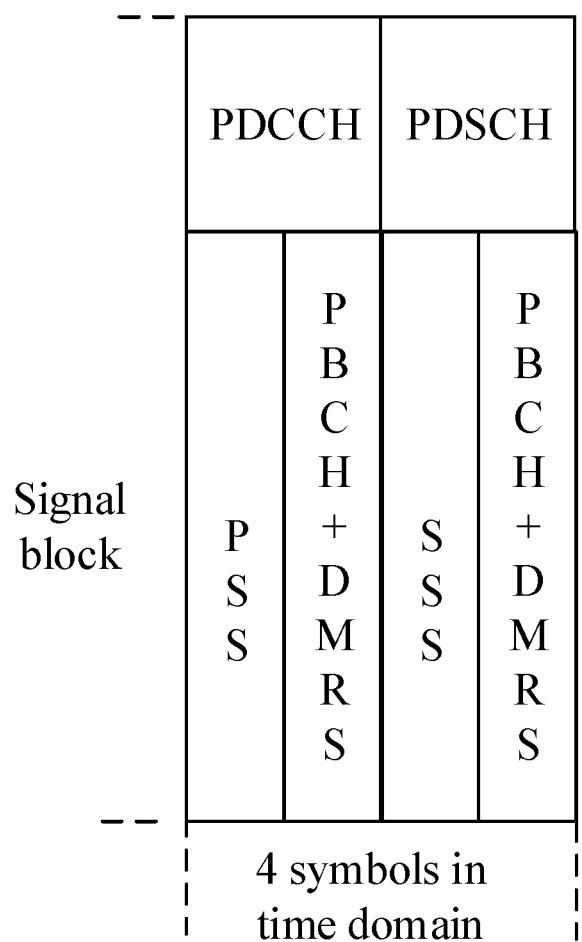
FIG. 9 is a schematic diagram illustrating a signal block according to a particular first embodiment.
Figure 10A:
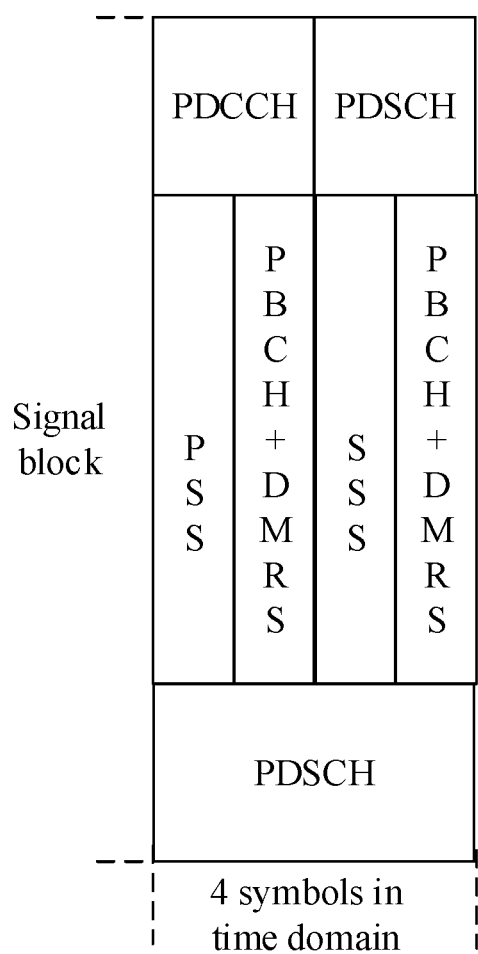
FIG. 10A is a schematic diagram illustrating a signal block, according to an exemplary embodiment.

As shown in FIG. 9 and FIG. 10A, the information of physical downlink common channel may be positioned only in the high frequency portion above the SSB, or may be located on either side of the SSB and distributed in both the high frequency and low frequency portions.

In the above example, a priority is given to the transmission of the CORESET and then the transmission of the data information in time domain. In transmitting the data information, the data information of RMSI can be guaranteed firstly, and if there are still available resources, the paging information and other information about broadcast channel are transmitted. After determining the data information and the CORESET, if the bandwidth occupied by the signal block still does not meet the requirement of basic bandwidth proportion, the remaining available resources can be filled with reference signals.

The starting position of the information of PDSCH can be flexibly configured, and it is not necessary to start from transmitting of the first symbol, for example, it can start from transmitting of the second symbol.

After the UE finds RMSI at the specified RMSI position, it determines the CORESET and PDSCH of the Paging or OSI based on the configuration of the information such as Paging information or OSI information by the system.

Figure 10B:
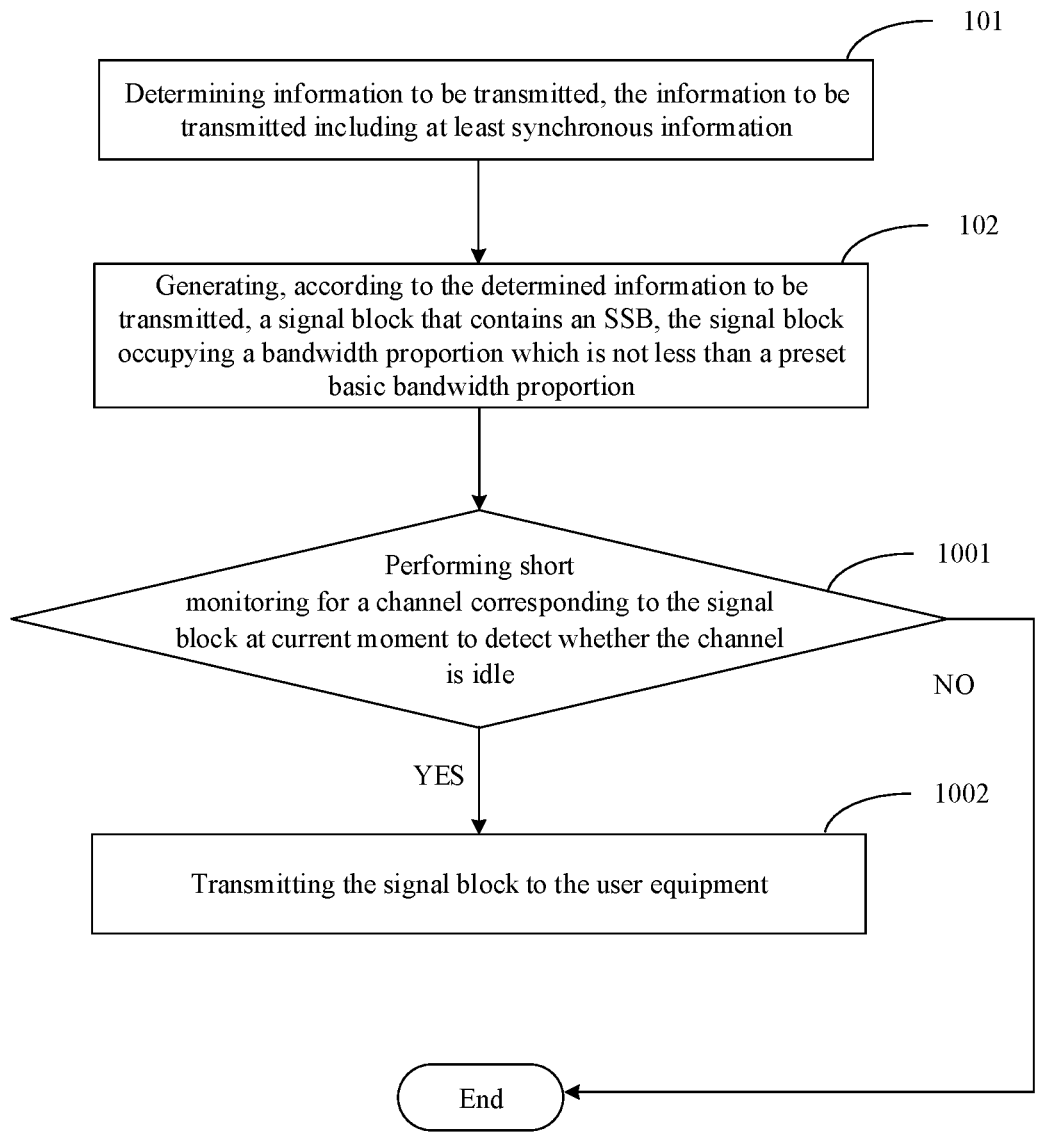
FIG. 10B is a flow chart illustrating a method for synchronous broadcasting transmission of a signal block according to an exemplary embodiment.

In an embodiment, as shown in FIG. 10B, before transmitting the signal block to the user equipment, the method further includes step 1001.

In step 1001, short monitoring is performed for a channel corresponding to the signal block at current moment to detect whether the channel is idle.

The step 103 includes step 1002.

In step 1002, the signal block is transmitted to the user equipment if the channel is idle.

In the present embodiment, short monitoring is employed for the entire signal block to detect whether the channel is idle. That is, the short monitoring is performed on the respective channels corresponding to the SSB, the data information, the CORESET and the reference signal at the current transmitting moment to satisfy the frequency-division multiplexing of so many pieces of information.

Here, the short monitoring is also known as short carrier monitoring, the carrier monitoring is also a Listen Before Talk (LBT) strategy.

When the channel is not idle, the transmitting of the SSB is abandoned, thus there is no problem of not satisfying the basic bandwidth proportion.

The above embodiments can be combined freely if needed.

The embodiments of a device according to the present disclosure will be provided, and can be used to perform the embodiments of the method of the present disclosure.

Figure 11A:
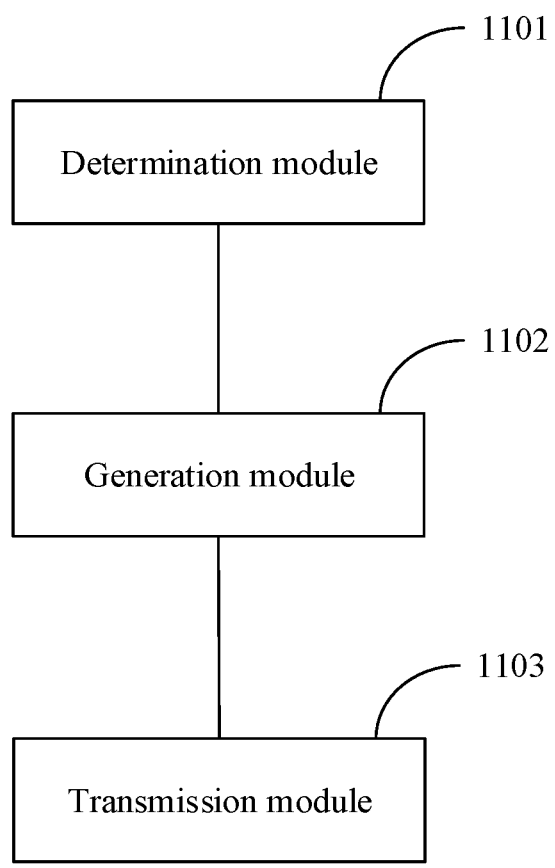
FIG. 11A is a block diagram illustrating a device for synchronous broadcasting transmission of a signal block according to a particular second embodiment.

FIG. 11A is a block diagram illustrating a device for synchronous broadcasting transmission of a signal block according to an exemplary embodiment. The device may be implemented as part or all of an electronic device by software, hardware, or a combination thereof. Referring to FIG. 11A, the device for synchronous broadcasting transmission of a signal block includes a determination module 1101, a generation module 1102 and a transmission module 1103.

The determination module 1101 is configured to determine information to be transmitted. The information to be transmitted includes at least synchronous information.

The generation module 1102 is configured to generate, according to the determined information to be transmitted, a signal block that contains an SSB. The signal block occupies a bandwidth proportion which is not less than a preset basic bandwidth proportion.

The transmission module 1103 is configured to transmit the signal block to a user equipment.

In an embodiment, the SSB occupies 2 symbols in time domain, or 4 symbols in time domain.

In an embodiment, a primary synchronous signal and a secondary synchronous signal in the SSB occupy a total of 2 symbols in time domain, or a total of 1 symbol in time domain.

In an embodiment, the synchronous information in the SSB is time-division multiplexed or frequency-division multiplexed with information of PBCH.

In an embodiment, the information to be transmitted further includes information of physical downlink common channel.

The information of physical downlink public channel is frequency-division multiplexed with the SSB.

In an embodiment, the information of physical downlink common channel includes at least one of: data information, a control resource set and a reference signal.

Here, the data information includes at least one of: data information of RMSI, paging information and other information about broadcast channels.

The control resource set includes control information for scheduling RMSI.

In an embodiment, the information of physical downlink common channel occupies signal resources on one or both sides of the SSB in frequency domain.

Figure 11B:
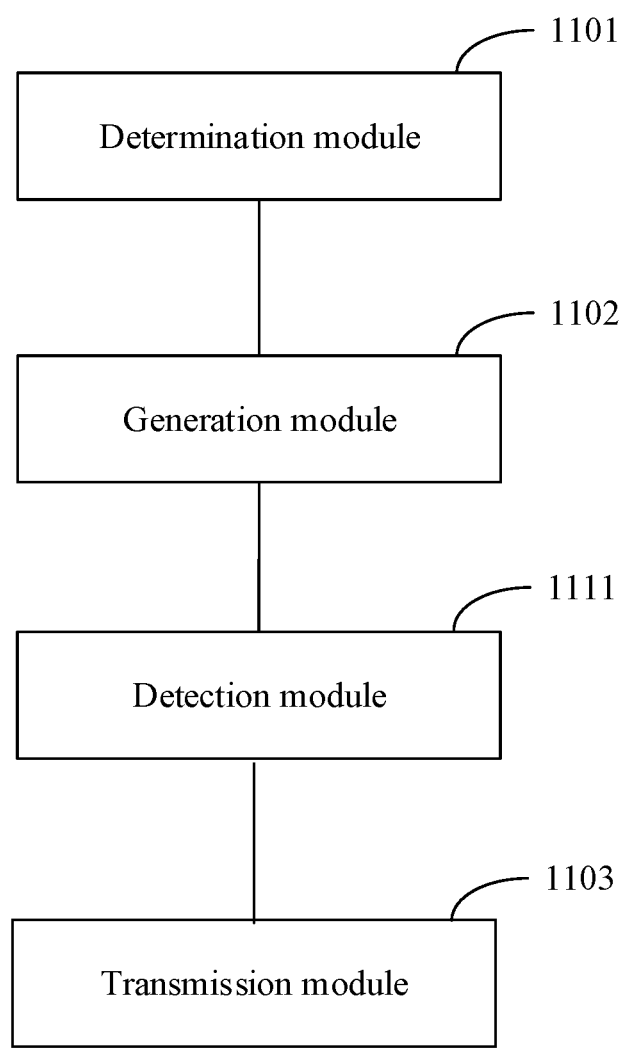
FIG. 11B is a block diagram illustrating a device for synchronous broadcasting transmission of a signal block according to a particular second embodiment.

In an embodiment, as shown in FIG. 11B, the device further includes a detection module 1111.

The detection module is configured to perform short monitoring for a channel corresponding to the signal block at current moment to detect whether the channel is idle.

Figure 11C:
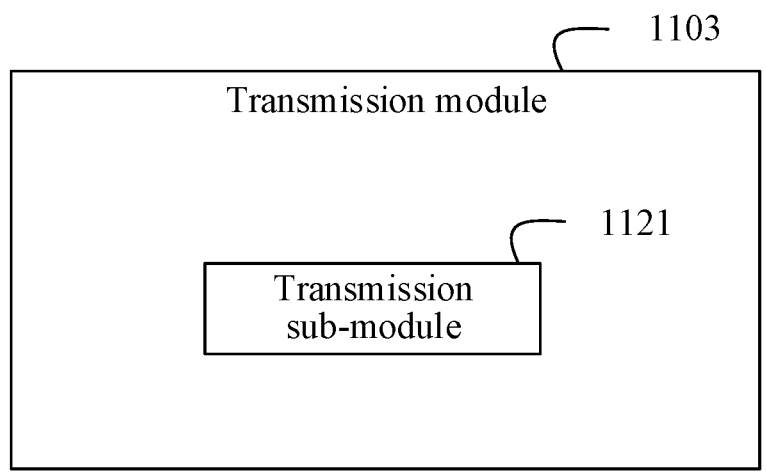
FIG. 11C is a block diagram illustrating a transmission module according to a particular second embodiment.

As shown in FIG. 11C, the transmission module 1103 includes a transmission sub-module 1121.

The transmission sub-module is configured to transmit the signal block to the user equipment if the channel is idle.

With regard to the device in the embodiments as described above, the specific manner in which each module performs the operation has been described in detail in the embodiments relating to the method and will not be explained in detail herein.

Figure 12:
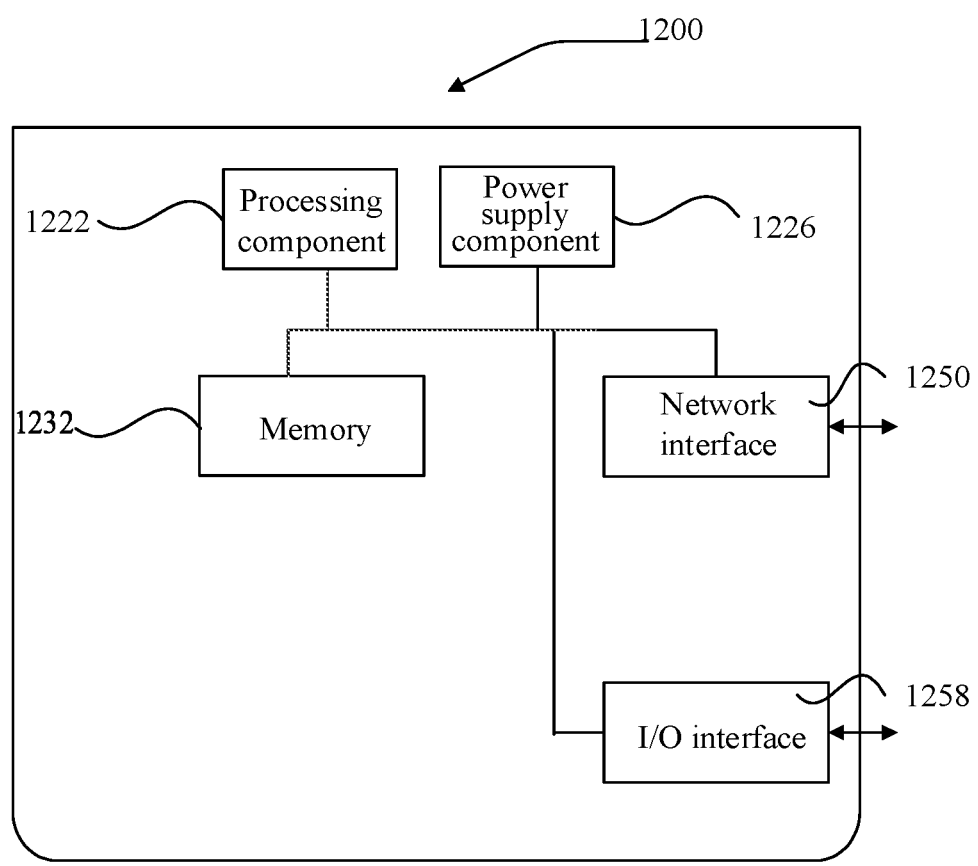
FIG. 12 is a block diagram illustrating a device suitable for synchronous broadcasting transmission of a signal block according to an exemplary embodiment.

FIG. 12 is a block diagram illustrating a device for synchronous broadcasting transmission of a signal block according to an exemplary embodiment. For example, the device 1200 may be provided as a computer. Referring to FIG. 12, the device 1200 includes a processing component 1222, which further includes one or more processors, and a memory resource represented by a memory 1232 for storing instructions, such as applications, that can be executed by the processing component 1222. The application stored in memory 1232 may include one or more modules each of which corresponds to a set of instructions. In addition, the processing component 1222 is configured to execute instructions to perform the method as described above for synchronous broadcasting transmission of a signal block.

The device 1200 may further include a power supply component 1226 which is configured to perform power management for the device 1200, a wired or wireless network interface 1250 which is configured to connect the device 1200 to the network, and an input/output (I/O) interface 1258. The device 1200 may operate an operating system based on the operating system stored in memory 1232, such as Windows Server™, Mac OS X™, Unix™, Linux™, FreeBSD™ or the like.

In an exemplary embodiment, there is provided a device for synchronous broadcasting transmission of a signal block, including:

a processor;

a memory for storing instructions executable by the processor;

wherein the processor is configured to:

determine information to be transmitted, the information to be transmitted including at least synchronous information;

generate, according to the determined information to be transmitted, a signal block that contains an SSB, the signal block occupying a bandwidth proportion which is not less than a preset basic bandwidth proportion;

transmit the signal block to a user equipment.

The above processor may be further configured to:

the SSB occupies 2 symbols in time domain, or 4 symbols in time domain.

The above processor may be further configured to:

the PSS and the SSS in the SSB occupy a total of 2 symbols in time domain, or a total of 1 symbol in time domain.

The above processor may be further configured to:

the synchronous information in the SSB is time-division multiplexed or frequency-division multiplexed with information of PBCH.

The above processor may be further configured to:

the information to be transmitted further includes information of physical downlink common channel.

The information of physical downlink public channel is frequency-division multiplexed with the SSB.

The above processor may be further configured to:

the information of physical downlink common channel includes at least one of: data information, a control resource set and a reference signal;

wherein the data information includes at least one of: data information of RMSI, paging information and other information about broadcast channels;

The control resource set includes control information for scheduling RMSI.

The above processor may be further configured to:

the information of physical downlink common channel occupies signal resources on one or both sides of the SSB in frequency domain.

The above processor may be further configured to:

before transmitting the signal block to the user equipment, the method further includes:

performing short monitoring for a channel corresponding to the signal block at current moment to detect whether the channel is idle;

transmitting the signal block to the user equipment includes:

transmitting the signal block to the user equipment if the channel is idle.

There is provided a computer-readable storage medium having stored therein computer instructions that when executed by a processor, implement the method described above for synchronous broadcasting transmission of a signal block, the method including:

determining information to be transmitted, the information to be transmitted including at least synchronous information;

generating, according to the information to be transmitted, a signal block that contains an SSB, the signal block occupying a bandwidth proportion which is not less than a preset basic bandwidth proportion; and transmitting the signal block to a user equipment.

The instructions in the storage medium may further include:

the SSB occupies 2 symbols in time domain, or 4 symbols in time domain.

The instructions in the storage medium may further include:

the PSS and the SSS in the SSB occupy a total of 2 symbols in time domain, or a total of 1 symbol in time domain.

The instructions in the storage medium may further include:

the synchronous information in the SSB is time-division multiplexed or frequency-division multiplexed with information of PBCH.

The instructions in the storage medium may further include:

the information to be transmitted further includes information of physical downlink common channel.

The information of physical downlink public channel is frequency-division multiplexed with the SSB.

The instructions in the storage medium may further include:

the information of physical downlink common channel includes at least one of: data information, a control resource set and a reference signal;

wherein the data information includes at least one of: data information of RMSI, paging information and other information about broadcast channels.

The control resource set includes control information for scheduling RMSI.

The instructions in the storage medium may further include:

the information of physical downlink common channel occupies signal resources on one or both sides of the SSB in frequency domain.

The instructions in the storage medium may further include:

before transmitting the signal block to the user equipment, the method further includes:

performing short monitoring for a channel corresponding to the signal block at current moment to detect whether the channel is idle;

transmitting the signal block to the user equipment includes:

transmitting the signal block to the user equipment if the channel is idle.

Other embodiments of the disclosure will be apparent to those skilled in the art from consideration of the specification and practice of the disclosure disclosed here. This application is intended to cover any variations, uses, or adaptations of the disclosure following the general principles of the present application, and to include common knowledge or conventional technical means in the art that is not disclosed in the present disclosure. It is intended that the specification and embodiment be considered as exemplary only, with a true scope and spirit of the disclosure being indicated by the appended claims.

It will be appreciated that the present disclosure is not limited to the exact construction that has been described above and illustrated in the accompanying drawings, and that various modifications and changes can be made without departing from the scope the present disclosure. It is intended that the scope of the disclosure only be defined by the appended claims.

What is claimed is:

1. A method for synchronous broadcasting transmission of a signal block, comprising:

determining information to be transmitted, the information to be transmitted comprising at least synchronous information;

generating, according to the determined information to be transmitted, a signal block that contains a synchronization signal/physical broadcast channel (SS/PBCH) Block (SSB), the signal block occupying a bandwidth proportion which is not less than a preset basic bandwidth proportion, wherein the preset basic bandwidth proportion represents that a use of unlicensed spectrum is subject to a principle of occupied channel bandwidth (OCB), the principle of occupied OCB is that a transmitting signal is required to occupy a preset proportion of a transmitting bandwidth; and transmitting the signal block to user equipment;

wherein the SSB occupies 2 symbols in time domain, or 4 symbols in time domain; and wherein a primary synchronous signal and a secondary synchronous signal in the SSB occupy a total of 1 symbol in time domain.

2. The method of claim 1, wherein the synchronous information in the SSB is time-division multiplexed or frequency-division multiplexed with information of physical broadcast channel (PBCH).

3. The method of claim 1, wherein the information to be transmitted further comprises information of physical downlink common channel;

the information of physical downlink public channel is frequency-division multiplexed with the SSB.

4. The method of claim 3, wherein the information of physical downlink common channel comprises at least one of: data information, a control resource set and a reference signal;

wherein the data information comprises at least one of: data information of remaining minimum system information (RMSI), paging information and other information about broadcast channels; and the control resource set comprises control information for scheduling RMSI.

5. The method of claim 3, wherein the information of physical downlink common channel occupies signal resources on one or both sides of the SSB in frequency domain.

6. The method of claim 1, wherein before transmitting the signal block to the user equipment, the method further comprises:

performing short monitoring for a channel corresponding to the signal block at current moment to detect whether the channel is idle;

transmitting the signal block to the user equipment comprises:

transmitting the signal block to the user equipment if the channel is idle.

7. A communication system implementing the method of claim 1, wherein the communication system provides multiple solutions including that:

multiple implementations of possible resource locations occupied by primary synchronous signal and secondary synchronous signal are provided to implement and increase the bandwidth occupied by the signal block;

multiple position relation of synchronous information and information of PBCH on time-frequency resources is provided to facilitate flexible adoption;

information of physical downlink public channel is frequency-division multiplexed with the SSB to further increase the bandwidth occupied by the signal block to meet requirements of communication protocol;

the communication system is configured to multiplex multiple information by frequency division to ensure that proportion occupied by the signal block is not less than proportion of a preset basic bandwidth;

information of physical downlink common channel and SSB are frequency-division multiplexed, to facilitate flexible configuration of position relation between the information of physical downlink common channel and SSB in frequency domain; and the communication system is further configured for short monitoring to detect whether a channel is idle, thereby improving detection efficiency and accuracy.

8. A device for synchronous broadcasting transmission of a signal block, comprising:

a processor; and memory for storing instructions executable by the processor;

wherein the processor is configured to:

determine information to be transmitted, the information to be transmitted comprising at least synchronous information;

generate, according to the determined information to be transmitted, a signal block that contains a synchronization signal/physical broadcast channel (SS/PBCH) Block (SSB), the signal block occupying a bandwidth proportion which is not less than a preset basic bandwidth proportion, wherein the preset basic bandwidth proportion represents that a use of unlicensed spectrum is subject to a principle of occupied channel bandwidth (OCB), the principle of occupied OCB is that a transmitting signal is required to occupy a preset proportion of a transmitting bandwidth;

transmit the signal block to user equipment;

wherein the SSB occupies 2 symbols in time domain, or 4 symbols in time domain; and wherein a primary synchronous signal and a secondary synchronous signal in the SSB occupy a total of 1 symbol in time domain.

9. The device of claim 8, wherein the synchronous information in the SSB is time-division multiplexed or frequency-division multiplexed with information of physical broadcast channel (PBCH).

10. The device of claim 8, wherein the information to be transmitted further comprises information of physical downlink common channel;

the information of physical downlink public channel is frequency-division multiplexed with the SSB.

11. The device of claim 10, wherein the information of physical downlink common channel comprises at least one of: data information, a control resource set and a reference signal;

wherein the data information comprises at least one of: data information of remaining minimum system information (RMSI), paging information and other information about broadcast channels; and the control resource set comprises control information for scheduling RMSI.

12. The device of claim 10, wherein the information of physical downlink common channel occupies signal resources on one or both sides of the SSB in frequency domain.

13. The device of claim 8, wherein the processor is further configured to:

perform short monitoring for a channel corresponding to the signal block at current moment to detect whether the channel is idle, and transmit the signal block to the user equipment if the channel is idle.

14. A non-transitory computer-readable storage medium having stored therein computer instructions that when executed by a processor, implement a method for synchronous broadcasting transmission of a signal block, the method comprising:

determining information to be transmitted, the information to be transmitted comprising at least synchronous information;

generating, according to the determined information to be transmitted, a signal block that contains a synchronous signal block, the signal block occupying a bandwidth proportion which is not less than a preset basic bandwidth proportion, wherein the preset basic bandwidth proportion represents that a use of unlicensed spectrum is subject to a principle of occupied channel bandwidth (OCB), the principle of occupied OCB is that a transmitting signal is required to occupy a preset proportion of a transmitting bandwidth; and transmitting the signal block to user equipment;

wherein the SSB occupies 2 symbols in time domain, or 4 symbols in time domain; and wherein a primary synchronous signal and a secondary synchronous signal in the SSB occupy a total of 1 symbol in time domain.

15. The non-transitory computer-readable storage medium of claim 14, wherein the synchronous information in the SSB is time-division multiplexed or frequency-division multiplexed with information of physical broadcast channel (PBCH).

16. The non-transitory computer-readable storage medium of claim 14, wherein the information to be transmitted further comprises information of physical downlink common channel;

the information of physical downlink public channel is frequency-division multiplexed with the SSB.

* * * * *